Figure 1:
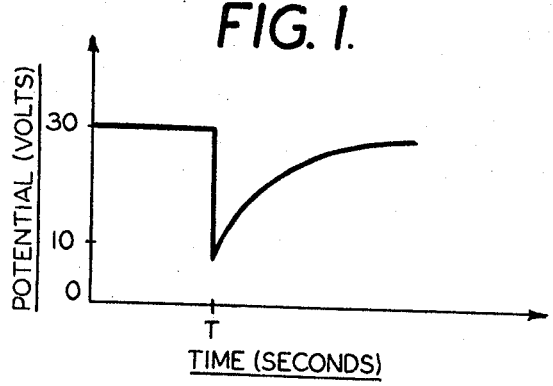

United States Patent
Frezzolini et al.

[15] 3,656,045
[45] Apr. 11, 1972

[54] BATTERY PROTECTION CIRCUIT

[72] Inventors: James Frezzolini; James J. Crawford, both of Ringwood, N.J.

[73] Assignee: Frezzolini Electronics Inc., Hawthorne, N.J.

[22] Filed: Apr. 16, 1971

[21] Appl. No.: 134,614

[52] U.S. Cl. ............................320/34, 307/10 BP, 317/31, 317/33 R, 317/40 R
[51] Int. Cl. ............................................H02l 3/20
[58] Field of Search ..............317/31, 33 R, 40 R; 320/34, 320/36, 40; 307/10 BP, 92, 117

[56] References Cited

UNITED STATES PATENTS

| | | |
|---|---|---|
| 2,369,826 | 2/1945 | Heyer et al............................320/34 X |
| 2,443,968 | 6/1948 | Swing...................................320/34 X |
| 2,955,245 | 10/1960 | Payne et al..........................320/34 X |

*Primary Examiner*—James D. Trammell
*Attorney*—Paul Fields

[57] ABSTRACT

The circuit comprises a pair of input terminals adapted to be connected with a battery and a pair of output terminals adapted to be connected with a load. Switch means is provided which is operable between a first state to connect said pair of input and output terminals in a series loop and a second state wherein said switch means disconnects at least one input from one output terminal. Disconnect means is operable in response to the battery potential falling below a preselected value for operating the switch means to the second state. Disabling means is provided which is operable in response to the battery temperature falling below a predetermined temperature for disabling the disconnect means.

11 Claims, 2 Drawing Figures

BATTERY PROTECTION CIRCUIT 10

Patented April 11, 1972

3,656,045

INVENTORS
JAMES FREZZOLINI
JAMES J. CRAWFORD
BY
Paul Fields
ATTORNEY

BATTERY PROTECTION CIRCUIT

This invention relates generally to a battery protection circuit for protecting a battery from completely discharging and, more particularly pertains to a battery protection circuit which is particularly adapted to operate efficiently in cold weather.

With the advent of rechargeable batteries, and particularly in view of the fact that most battery operated devices include charging apparatus which is operable to recharge the battery during periods of nonuse of the associated device, it becomes increasingly important not to permit the battery to be completely discharged. The reason for this becomes abundantly clear from a consideration of the following battery theory.

Batteries usually comprise a plurality of series-connected cells. If the battery is permitted to completely discharge, the different cells usually retain different charges thereby creating an imbalance between cells. Thereafter, if an attempt is made to charge such completely discharged batteries, the battery may be ruined. In fact, in practice, it has been found that the recharging of such batteries has resulted in gassing of the batteries and, in many cases, the batteries have exploded with consequent damage to both personnel and property located within the vicinity of the exploding battery.

Accordingly, disconnect circuits have been provided to prevent the complete discharging of batteries. For example, our copending application Ser. No. 100,593, filed on Dec. 22, 1970 entitled Battery Apparatus and assigned to the assignee of the present invention discloses such an arrangement. In the operation of the circuit disclosed therein, when the battery potential falls below a preselected value, the battery is disconnected from the load thereby preventing the complete discharge of the battery.

However, in many applications it has been found that the terminal potential of a battery drops suddenly and drastically when the battery is initially connected across a load. This is particularly true of silver-type batteries such as silver-cadmium, etc. when operated in cold weather, as noted in detail below. While this drop in potential is only momentary, the disconnect circuits have sensed such drop in battery potential and have responded by preventing the connection of the battery to the load. Thus, the load would never receive energy under such conditions.

Accordingly, an object of the present invention is to provide an improved battery protection circuit.

Another object of the present invention is to provide a battery protection circuit which prevents the complete discharge of the battery.

A more specific object of this aspect of the invention resides in the novel details of circuitry which provide a battery protection circuit of the type described which permits energy to be transmitted to the load from the battery under extreme cold conditions.

Accordingly, a battery protection circuit constructed according to the present invention comprises a pair of input terminals each adapted to be connected to a respective terminal of a battery and a pair of output terminals each adapted to be connected to a respective terminal of a load. A lead connects one of said pair of input terminals to one of said pair of output terminals. Switch means is provided which is operable between a first state wherein said switch means connects the other of said pair of input terminals with the other of said pair of output terminals and a second state wherein said switch means disconnects said other input and output terminals. Disconnect means is responsive to a preselected value of said battery voltage for operating the switch means to the second state. Additionally, disabling means is provided which is responsive to a predetermined temperature for disabling said disconnect means to prevent the operation of the disconnect means.

Figure 2:
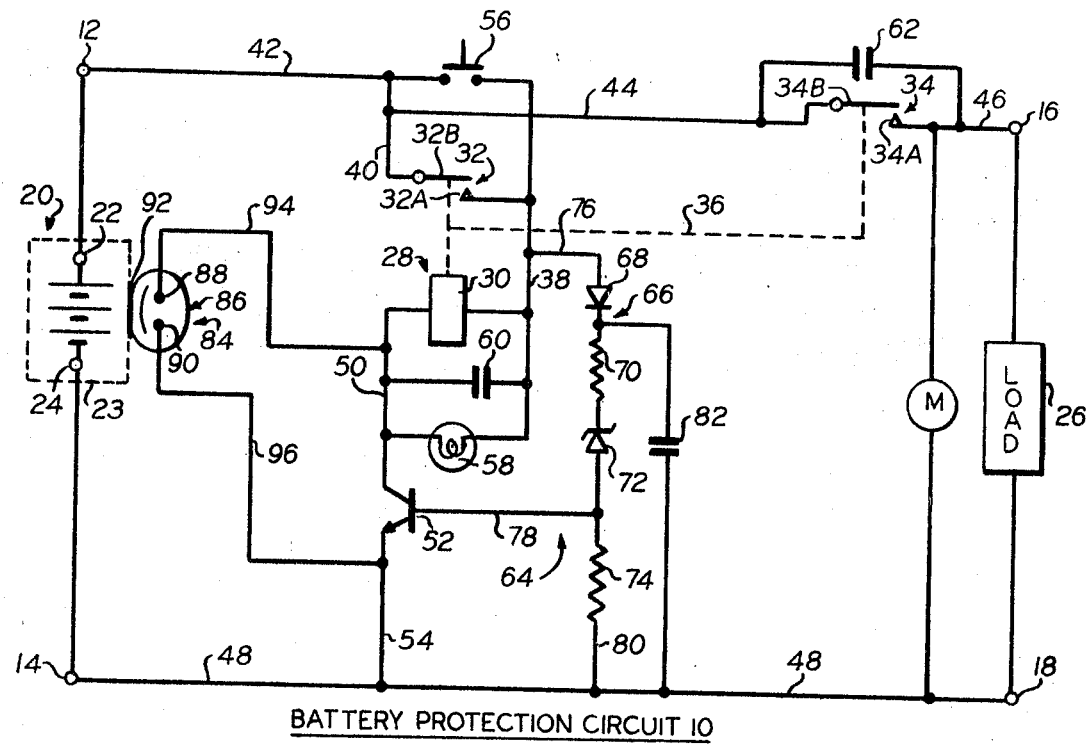

Other features and advantages of the present invention will become more apparent from a consideration of the following detailed description when taken in conjunction with the accompanying drawings, in which:

FIG. 1 is a curve of the potential of a silver-type battery as a function of time, illustrating the decrease in terminal voltage of the battery when a load is connected across the terminals of the battery; and FIG. 2 is a schematic circuit wiring diagram, partially in diagrammatic form, of a battery protection circuit constructed according to the present invention.

It is believed that an explanation of the effect of cold weather on the terminal voltage of a battery will facilitate an understanding and an appreciation of the present invention. Thus, FIG. 1 illustrates a curve of the terminal voltage of a silver-type battery such as silver-cadmium, for example, as a function of time under cold weather conditions wherein the ambient temperatures is approximately 10° F. It is assumed that the no-load terminal voltage or potential of the battery is 30 volts.

Accordingly, with no load connected to the battery, the potential measured across the terminals of the battery will remain at 30 volts regardless of the temperature as long as the battery remains fully charged. At time T, however, the battery is connected across the load. Accordingly, as shown in FIG. 1, the terminal voltage of the battery suddenly plummets to a point below 10 volts. Thereafter, as current is drawn from the battery the battery begins to rise to the no-load terminal voltage until it finally reaches the load terminal voltage (i.e., the no-load terminal voltage less the voltage drop across the internal resistance of the battery).

Accordingly, it will become obvious that if a battery of the type having the characteristic illustrated in FIG. 1 is utilized in conjunction with a protective circuit of the type noted above and described more fully in said copending application, the battery will never be connected to the load and, accordingly, the load will remain de-energized. To be more specific, the battery protection circuit of the type described in said copending application will prevent the connection of the battery to the load if the battery voltage is below 10 volts, for example. Since, in the example under consideration, the terminal voltage of the battery drops below 10 volts as soon as the load is applied thereacross, the protection circuit will prevent the battery from being connected to the load. On the other hand, the battery protection circuit of the present invention is operable to permit the battery to be connected to the load regardless of a low ambient temperature and to still prevent complete discharge of the battery.

The battery protection circuit constructed according to the present invention is illustrated in FIG. 2 and is designated generally by the reference numeral 10. More specifically, the battery protection circuit 10 comprises a pair of input terminals 12 and 14 and a pair of output terminals 16 and 18. The terminals 12 and 14 are adapted to be connected to the respective terminals of a battery designated generally by the reference numeral 20. More specifically, the terminal 12 is connected to the terminal or electrode 22 of the battery and the terminal 14 is connected to the terminal or electrode 24 of the battery 20. Additionally, the output terminals 16 and 18 are adapted to be connected to the respective terminals of a load 26.

A switching arrangement or switch means designated generally by the reference numeral 28 is provided for connecting the battery 20 across the load 26. To put this another way, the switching arrangement 28 connects the pair of input terminals 12 and 14 and the pair of output terminals 16 and 18 in a series loop through the battery 20 and the load 26.

The switching arrangement 28 includes a relay having a relay winding 30 and normally open sets of contacts 32 and 34 which are adapted to be closed when the relay winding 30 is energized, as indicated by the dashed line 36. One end of the relay winding 30 is connected by a lead 38 to contact 32A of the set of contacts 32. Movable contact 32B which is adapted to engage contact 32A when the relay winding is energized is connected to a lead 40 which, in turn, is connected to a lead 42. The lead 42 is connected to the input terminal 12.

Additionally, the lead 40 is connected by a lead 44 to the movable contact 34B of the set of contacts 34. Contact 34A of the set of contacts 34 is connected by lead 46 to the output terminal 16. Additionally, the input terminal 14 and the output terminal 18 are connected by a lead 48. The other end of the relay winding 30 is connected to the lead 48 through a circuit comprising a lead 50, the collector-emitter path of a transistor 52, and a lead 54.

The lead 38 is also connected to one terminal of a two-terminal normally open push-button switch 56. The other terminal of the switch 56 is connected to the lead 42. Moreover, a lamp 58 and a capacitor 60 are connected in parallel with the relay winding 30 between the leads 50 and 38. Similarly, a capacitor 62 is connected across the contacts 34A and 34B of the set of contacts 34 between the leads 44 and 46.

For purposes of explanation, it is assumed initially that the transistor 52 is fully conducting. Accordingly, when the push-button 56 is momentarily depressed, the relay winding 30 will be connected across the input terminals 12 and 14 and thereby across the battery 20 via the circuit comprising lead 42, lead 38, the relay winding 30, lead 50, transistor 52, lead 54, and lead 48. Hence, the relay winding 30 will be energized thereby closing sets of contacts 32 and 34. When the set of contacts 34 closes the battery 20 will be connected across the load 26 through the circuit comprising input terminal 12, leads 42, 40 and 44, the set of contacts 34, output terminals 16 and 18, and the lead 48 which is connected to the other input terminal 14.

Additionally, a holding circuit will be established about the relay winding 30 which will maintain the relay winding energized even through the push-button 56 is permitted to return to its normally-open position. The holding circuit includes the lead 40 which is connected to the energized lead 42, the now closed set of contacts 32 and the lead 38 which is connected to the contact 32A. That is, the set of contacts 32 is essentially connected in parallel with the switch 56 and once these contacts close the switch 56 will be shunted and the relay will remain energized. As a result, the push-button 56 need only be operated momentarily to cause the battery 20 to be connected to the load 26. When the relay winding 30 is energized the lamp 58, which is connected in parallel therewith, will similarly be energized to indicate that the relay is closed and that the battery is connected to the load. It is to be noted that the capacitor 62 is utilized simply to prevent arcing across the contacts 34A and 34B when these contacts open, in the conventional manner.

In light of the above, the relay may be thought of as being operable between a first state wherein the relay connects the battery 20 to the load 26 through the closed contacts 34A and 34B, and a second state wherein the relay is de-energized and the battery is disconnected from the load 26 via the normally-open set of contacts 34. The transistor 52 forms a part of a disconnect network, designated generally by the reference numeral 64, which is adapted to de-energize the relay winding 30 when the battery potential falls below a preselected value to prevent the complete discharge of the battery 20.

More specifically, the disconnect network 64 includes a biasing arrangement designated generally by the reference numeral 66 comprising the series circuit of a diode 68, a resistor 70, a Zener diode 72, and a resistor 74. The anode electrode of the diode 68 is connected to the lead 38 by a lead 76. A lead 78 connects the base electrode of the transistor 52 to the junction of the Zener diode 72 and the resistor 74 and a lead 80 connects the other end of the resistor 74 to the lead 48. The Zener diode 72 is oriented so that the cathode electrode thereof is connected to the resistor 70 and the anode electrode thereof is connected to the resistor 74. Additionally, a capacitor 82 is connected between the junction of the diode 68 and the resistor 70 and the lead 48.

As noted above, the lead 38 is essentially connected to the input terminal 12 and lead 48 is connected to the input terminal 14. Accordingly, the biasing arrangement 66 is effectively connected across the battery 20. The components of the biasing arrangement or network 66 are chosen so that the transistor 52 will be biased into conduction when the battery terminal voltage is above a preselected value and will bias or cause the transistor 52 to cease conducting when the battery terminal voltage is at or below said preselected value. In practice, assuming that the battery no-load terminal voltage is 30 volts, the biasing arrangement and transistor 52 will be chosen so that the transistor 52 will conduct when the battery terminal voltage is above 10 volts but will cease conducting when the battery terminal voltage falls below 10 volts. However, it is to be emphasized that this is for illustrative purposes only and is not to be considered as being a limitation of the present invention.

Thus, when the battery terminal voltage is above 10 volts the transistor 52 conducts and permits the relay winding to be connected to the input terminal 14 and thereby to the battery electrode or terminal 24 through the collector-emitter path of the transistor. However, when the battery terminal voltage falls below 10 volts the transistor 52 ceases to conduct thereby effectively disconnecting the relay winding 30 from the input terminal 14 to cause the relay winding 30 to be de-energized. Thus, the sets of contacts 32 and 34 will open thereby disconnecting the battery from the load 26 and preventing the battery from becoming fully discharged.

It is to be noted that the capacitors 60 and 82 are provided to prevent intermittent operation of the circuit under pulse loads. That is, if the potential across the load 26 varies momentarily due to load conditions, the capacitors 60 and 82 will essentially operate as filter capacitors to maintain the potential across the relay winding 30 and across the biasing arrangement for the transistor 52 substantially constant so that the relay winding 30 will remain energized.

However, when the battery 20 is subjected to the cold weather conditions, closure of the switch 56 will apply the battery potential to the relay winding 30 and the biasing arrangement 66 which may cause the transistor 51 to begin conducting. However, as soon as the relay winding 30 is energized and the contacts 34 close, the battery will be applied across the load 26 thereby causing the battery terminal voltage to suddenly drop in the manner indicated in FIG. 1. Thus, the transistor 52 will be rendered nonconducting and the relay winding 30 will be de-energized thereby causing the relay contacts 34 to remain open. This condition will exist as long as the battery is subjected to such low temperatures. Hence, it will be impossible to energize the load 26 by the battery 20.

In accordance with the present invention, however, the battery protection circuit 10 is provided with a device which may be termed a disabling device, indicated generally by the reference numeral 84, which shunts or shorts out the collector-emitter path of the transistor 52 under cold weather conditions thereby permitting the relay winding 30 to be connected directly to the input terminal 14. Hence, the biasing arrangement 66 and the transistor 52 no longer control the energization of the relay winding 30. Therefore, the disabling device 84 effectively disables the disconnect network 64 at such low temperatures. However, as the battery 20 supplies current to the load 26 in response to the energization of the relay winding 30, the temperature of the battery will rise. As the temperature of the battery rises, the disabling device 84 ceases to operate thereby permitting the disconnect network to regain control of the operation of the relay winding 30 to prevent the battery from becoming fully discharged.

More specifically, the disabling device 84 includes a thermostat 86 of conventional construction which comprises a terminal 88 and a terminal 90. As is conventional with thermostats the thermostat includes a bimetallic strip or the like which is adapted to connect the terminal 88 with the terminal 90 when the temperature reaches a preselected value. In the example under consideration, the thermostat 86 is selected to cause the terminals 88 and 90 to be connected together when the temperature reaches 50° F. or below.

The battery 20 includes a casing 23 which is normally of aluminum or the like. The thermostat 86 is mounted in the casing 23 of the battery in heat-exchanging relationship therewith by a film of solder 92 or by welding, or by a bracket or the like so that the thermostat remains in heat-exchanging relationship with the battery casing. A lead 94 connects the terminal 88 of the thermostat 86 with the lead 50 and a lead 96 connects the terminal 90 of the thermostat to the lead 54.

The operation of the thermostat is as described hereinabove. That is, when the temperature of the battery 20 is at or below 50° F., the terminal 88 will be connected to the terminal 90 of the thermostat thereby shorting out the collector-emitter path of the transistor 52. Accordingly, when the switch 56 is operated by relay winding 30 will be energized through the circuit including thermostat 86 to cause the sets of contacts 32 and 34 to close. Current will then be supplied to the load 26 from the battery 20. The current will cause the battery 20 to increase in temperature until the battery temperature rises above 50° F. At this point, the thermostat 86 will open thereby disconnecting the terminal 90 from the terminal 88. However, at this point the terminal voltage of the battery 20 will have risen sufficiently so that the biasing arrangement 66 will bias the transistor 52 into conduction to maintain the relay winding 30 connected to the input terminal 14 through the collector-emitter path of the transistor 52. Hence, it is only necessary for the operator to maintain the push-button 56 closed until the terminal voltage of the battery 20 rises sufficiently to permit the biasing arrangement 66 to operate. It is to be noted that this time interval is extremely short.

Accordingly, a battery protection circuit has been described which is operable to connect a battery with a load and to disconnect the battery therefrom to prevent the complete discharge of the battery even under cold weather conditions.

While a preferred embodiment of the invention has been shown and described herein, it will be obvious that numerous omissions, changes and additions may be made in such embodiment without departing from the spirit and scope of the present invention.

What is claimed is:

1. A battery protection circuit comprising a pair of input terminals each adapted to be connected to a respective terminal of a battery, a pair of output terminals each adapted to be connected to a respective terminal of a load, a lead connecting one of said pair of input terminals to one of said pair of output terminals, switch means operable between a first state wherein said switch means connects the other of said pair of input terminals with the other of said pair of output terminals and a second state wherein said switch means disconnects said other input and output terminals, disconnect means responsive to a preselected value of said battery voltage for operating said switch means to the second state, and disabling means responsive to a predetermined temperature for disabling said disconnect means.

2. A battery protection circuit as in claim 1, and selectively operable operate means for initially operating said switch means to the first state.

3. A battery protection circuit as in claim 1, in which said battery includes a battery casing, and means for mounting said disabling means in heat-exchanging relationship with said casing.

4. A battery protection circuit as in claim 1, including a lead connecting said switch means and said disconnect means in a series loop between said pair of input terminals, and means for connecting said disabling means in shunt with said disconnect means whereby said disabling means connects said switch means directly between said pair of input terminals when the temperature reaches said predetermined temperature.

5. A battery protection circuit as in claim 1, in which said disconnect means comprises a transistor having a collector, a base and an emitter electrode; a lead connecting the collector and emitter electrodes of said transistor in a series loop with said switch means between said pair of input terminals; biasing means connected between said pair of input terminals and to said base electrode for biasing said transistor into conduction when the battery potential is above said preselected value for causing said transistor to be cut-off when the battery potential is at or below said preselected value.

6. A battery protection circuit as in claim 5, in which said disabling means comprises a thermostat connected between the collector and emitter electrodes of said transistor, said thermostat having first and second terminals and being operable to connect said first and second terminals together when the temperature drops to or below said predetermined value.

7. A battery protection circuit comprising a pair of input terminals each adapted to be connected to a respective terminal of a battery, a pair of output terminals each adapted to be connected to a respective terminal of a load, switch means operable between a first state wherein said switch means connects said pair of input and output terminals in a series loop through the load and the battery and a second state wherein said switch means disconnects at least one of said pair of input terminals from one of said pair of output terminals to break said series loop, disconnect means operable in response to the battery potential falling below a preselected value for operating said switch means to the second state, and disabling means operable in response to the battery temperature falling below a predetermined temperature for disabling said disconnect means.

8. A battery protection circuit as in claim 7, in which said disabling means comprises a thermostat adapted to be positioned in heat-exchanging relationship with the battery, a lead connecting said thermostat across said disconnect means whereby said thermostat shorts out said disconnect means when the temperature falls below said predetermined temperature.

9. A battery protection circuit as in claim 8, in which said disconnect means comprises a transistor connected in series with said switch means between said pair of input terminals, and a biasing network connected between said pair of input terminals and to said transistor for causing said transistor to cease conducting when the battery potential falls below said preselected value, said lead connecting said thermostat across said transistor.

10. A battery protection circuit as in claim 8, in which said switch means comprises a relay having a relay winding and at least a first pair of normally open contacts connected between at least one of said pair of input and one of said pair of output terminals adapted to be closed when said relay winding is energized, and a selectively operable switch for connecting said relay winding between said pair of input terminals to cause said relay winding to be energized by said battery.

11. A battery protection circuit as in claim 10, and a second pair of normally open contacts connected in parallel with said switch and adapted to be closed when said relay winding it energized to maintain said relay winding connected to said pair of input terminals.

* * * * *